(12) United States Patent
Vyvlečka et al.

(10) Patent No.: US 12,457,043 B2
(45) Date of Patent: Oct. 28, 2025

(54) OPTICAL APPARATUS FOR QUANTUM COMPUTING, SYSTEM, METHOD AND STORAGE MEDIUM

(71) Applicant: Tencent Technology (Shenzhen) Company Limited, Shenzhen (CN)

(72) Inventors: Michal Vyvlečka, Shenzhen (CN); Philip Walther, Shenzhen (CN); Elisabeth Lerchbaumer, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 248 days.

(21) Appl. No.: 18/144,508

(22) Filed: May 8, 2023

(65) Prior Publication Data

US 2023/0318716 A1    Oct. 5, 2023

Related U.S. Application Data

(63) Continuation of application No. PCT/CN2022/120888, filed on Sep. 23, 2022.

(30) Foreign Application Priority Data

Oct. 27, 2021   (CN) .................... 202111258194.1
Oct. 29, 2021   (CN) .................... 202111272875.3

(51) Int. Cl.
*G06F 21/00*   (2013.01)
*G06N 10/70*   (2022.01)
*H04B 10/70*   (2013.01)

(52) U.S. Cl.
CPC ............ *H04B 10/70* (2013.01); *G06N 10/70* (2022.01)

(58) Field of Classification Search
CPC ................................ G06N 10/70; H04B 10/70
See application file for complete search history.

(56) References Cited

U.S. PATENT DOCUMENTS

| 2004/0021063 A1 | 2/2004 | Dultz et al. |
| 2004/0095582 A1 | 5/2004 | Holbrook |

(Continued)

FOREIGN PATENT DOCUMENTS

CN    112865879 A    5/2021

OTHER PUBLICATIONS

Tencent Technology, WO, PCT/CN2022/120888, Dec. 15, 2022, 4 pgs.

(Continued)

*Primary Examiner* — Rodman Alexander Mahmoudi
(74) *Attorney, Agent, or Firm* — Morgan, Lewis & Bockius LLP

(57) ABSTRACT

This application discloses an optical apparatus for quantum computing, a system, a method and a storage medium. The apparatus includes: a delay generation module configured to generate different time delays for n photons respectively; an optical fiber collimation module configured to convert light rays of the n photons into n collimated light rays to propagate; a quasi-spatial mode generation module configured to enable the light rays of the n photons to pass through the same active optical element in sequence, the active optical element being configured to modulate the optical signals of the n photons in sequence according to the time sequence in which the n photons arrive; and a feedforward measurement module configured to perform polarimetry on a modulated optical signal of a first photon to obtain a measurement result for performing feedforward compensation or feedforward error correction on a measurement result of a second photon to be measured.

15 Claims, 5 Drawing Sheets

(56) References Cited

U.S. PATENT DOCUMENTS

| | | |
|---|---|---|
| 2019/0028271 A1 | 1/2019 | Röhsner et al. |
| 2021/0273731 A1 | 9/2021 | Zhang et al. |
| 2022/0014277 A1* | 1/2022 | Wang .................... G06N 10/40 |
| 2022/0101168 A1* | 3/2022 | Bourassa ............... G06N 10/40 |
| 2024/0353890 A1* | 10/2024 | Vacon ..................... G06F 1/14 |

OTHER PUBLICATIONS

André Stefanov et al., "Implementation of Quantum Algorithms using Optical Cluster State", 2007 European Conference on Lasers and Electro-Optics and the International Quantum Electronics Conference, Nov. 21, 2007, 3 pgs.

Tencent Technology, ISR, PCT/CN2022/120888, Dec. 15, 2022, 2 pgs.

* cited by examiner

OPTICAL APPARATUS FOR QUANTUM COMPUTING, SYSTEM, METHOD AND STORAGE MEDIUM

CROSS-REFERENCE TO RELATED APPLICATIONS

This application is a continuation application of PCT Patent Application No. PCT/CN2022/120888, entitled "OPTICAL APPARATUS FOR QUANTUM COMPUTING, SYSTEM, METHOD AND STORAGE MEDIUM" filed on Sep. 23, 2022, which claims priority to (i) Chinese Patent Application No. 202111258194.1, entitled "OPTICAL APPARATUS FOR QUANTUM COMPUTING, SYSTEM AND METHOD" filed on Oct. 27, 2021, and (ii) Chinese Patent Application No. 202111272875.3, entitled "OPTICAL APPARATUS FOR QUANTUM COMPUTING, SYSTEM, METHOD AND STORAGE MEDIUM" filed on Oct. 29, 2021, all of which are incorporated herein by reference in its entirety.

FIELD OF THE TECHNOLOGY

Embodiments of this application relate to the field of quantum computing technologies, and in particular, to an optical apparatus for quantum computing, a system, a method and a storage medium.

BACKGROUND OF THE DISCLOSURE

Measurement based quantum computing (MBQC) is a quantum computing method based on a highly entangled cluster state as a quantum computing resource.

In related art, a MBQC method is to measure polarization states of multiple photons through a photosensitive element. Due to entanglement between quanta in a cluster state, a random result will be measured for each measured quantum, and this result has an effect on a quantum to be subsequently measured. By feeding forward a measurement result of a previous quantum to a measurement result of a subsequent quantum, a more accurate value may be obtained.

However, in related art, MBQC needs to be implemented through a large quantity of active optical elements configured to measure quanta. Quantum equipment is bulky and costly.

SUMMARY

Embodiments of this application provide an optical apparatus for quantum computing, a system, a method and a storage medium, which can reduce the quantity of active optical elements configured to measure quantum data and reduce cost. The technical solutions are as follows:

According to one aspect of the embodiments of this application, an optical apparatus for quantum computing is provided. The apparatus includes: a delay generation module, an optical fiber collimation module, a quasi-spatial mode generation module and a feedforward measurement module, the feedforward measurement module including an active optical element configured to modulate optical signals;

the delay generation module being configured to generate different time delays for n photons respectively, wherein the n photons arrive at the active optical element at different times respectively, n being an integer greater than 1;

the optical fiber collimation module being configured to convert light rays of the n photons into n collimated light rays to propagate in a free space;

the quasi-spatial mode generation module being configured to control the light rays of the n photons propagating in the free space to pass through the same active optical element in sequence, and the active optical element being configured to modulate optical signals of the n photons in sequence according to the time sequence in which the n photons arrive at the active optical element; and the feedforward measurement module being configured to perform polarimetry on a modulated optical signal of a first photon to obtain a measurement result of the first photon, the measurement result of the first photon being used for performing feedforward compensation or feedforward error correction on a measurement result of a second photon to be measured; the first photon being one of the n photons, and the second photon being a next photon to be measured of the first photon.

According to one aspect of the embodiments of this application, a quantum computing system is provided. The system includes the optical apparatus for quantum computing described above.

According to one aspect of the embodiments of this application, a multi-photon mode active optical feedforward method is provided, applied in an optical apparatus for quantum computing. The apparatus includes: a delay generation module, an optical fiber collimation module, a quasi-spatial mode generation module and a feedforward measurement module, the feedforward measurement module including an active optical element configured to modulate optical signals; and the method includes:

generating, by the delay generation module, different time delays for n photons respectively, wherein the n photons arrive at the active optical element at different times respectively, n being an integer greater than 1;

converting, by the optical fiber collimation module, light rays of the n photons into n collimated light rays to propagate in a free space;

controlling, by the quasi-spatial mode generation module, the light rays of the n photons propagating in the free space to pass through the same active optical element in sequence, the active optical element being configured to modulate optical signals of the n photons in sequence according to the time sequence in which the n photons arrive at the active optical element; and performing, by the feedforward measurement module, polarimetry on a modulated optical signal of a first photon to obtain a measurement result of the first photon, the measurement result of the first photon being used for performing feedforward compensation or feedforward error correction on a measurement result of a second photon to be measured; the first photon being one of the n photons, and the second photon being a next photon to be measured of the first photon.

According to one aspect of the embodiments of this application, a non-transitory computer-readable storage medium is provided, storing a computer program, the computer program being loaded and executed by a processor to implement the multi-photon mode active optical feedforward method described above.

According to one aspect of the embodiments of this application, a computer program product is provided, including a computer program, the computer program being loaded and executed by a processor to implement the multi-photon mode active optical feedforward method described above.

The technical solutions provided in the embodiments of this application can achieve the following beneficial effects.

The delay generation module enables multiple photons in an entangled cluster state to have different time delays, and the quasi-spatial mode generation module enables the multiple photons to be in quasi-spatial modes which have very small spatial distances therebetween and do not overlap, wherein the system can complete several quick feedforward operations by only using one active optical element, to implement separate measurement of multiple photons, and obtain corresponding measurement results of the multiple photons respectively. The time delays of the multiple photons are different, wherein different photons arrive at the feedforward measurement module at different times. The feedforward measurement module performs measurement by using the interval between times of arrival of adjacent photons to obtain measurement results, and adjusts the system based on the measurement results, to implement feedforward compensation or correction. Since the same feedforward measurement module can obtain, by measurement, measurement results of multiple photons in an entangled state, the quantity of active optical elements used in the computing process is reduced, which helps to reduce the design difficulty of quantum equipment and reduce cost of the quantum equipment.

In addition, because the multiple photons arrive at the feedforward measurement module one by one, and the interval between times of arrival of the photons is small, the feedforward measurement module can perform feedforward operations at a high speed, without reducing the rate and computing accuracy of quantum computing and the security in the case of a cryptographic protocol, and without affecting the speed or universality of quantum computing.

DESCRIPTION OF EMBODIMENTS

Figure 1:
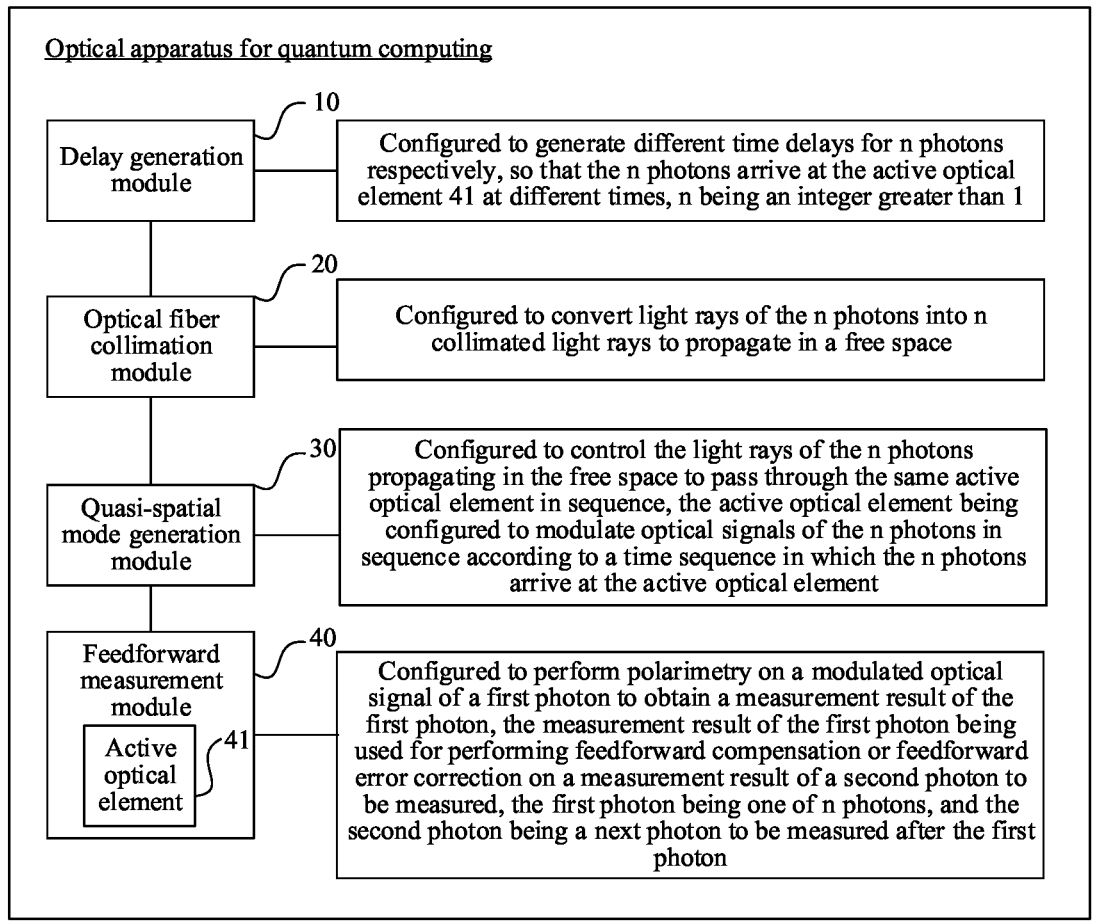
FIG. 1 is a structural block diagram of an optical apparatus for quantum computing provided by one embodiment of this application.

To make the objectives, technical solutions, and advantages of this application clearer, the following further describes implementations of this application in detail with reference to the accompanying drawings.

Before the embodiments of this application are introduced and explained, some terms involved in the embodiments of this application are first explained.

1. MBQC: is quantum computing implemented by encoding a computing process in a specific complex entangled state, and operating and measuring the entangled state in a specific sequence, including quantum state adjustment. MBQC is based on a highly entangled cluster state as a resource state of quantum computing. The computing itself is implemented by continuously measuring adjacent qubits from the cluster state. A measurement sequence, together with a measurement apparatus, defines a computer system that implements universal quantum computing by efficiently implementing arbitrary single-qubit and two-qubit (or multi-qubit) computing.

2. An electro-optical modulator (EOM): is a modulator made by using an electro-optical effect of some electro-optical crystals, such as lithium niobate (LiNbO3) crystal, gallium arsenide (GaAs) crystal and lithium tantalate (LiTaO3) crystal. The electro-optical effect means that when a voltage is applied to an electro-optical crystal, the refractive index of the electro-optical crystal will change, resulting in a change in the characteristics of a light wave passing through the crystal, and implementing modulation of the phase, amplitude, intensity and polarization state of an optical signal.

3. An acousto-optical modulator (AOM): is a modulator which uses an external modulation technology to control a change in the intensity of a laser beam. A modulation signal acts on a transducer in the form of an electrical signal (amplitude modulation), and then converts it into a wave field that changes in the form of an electrical signal. When a light wave passes through a medium, an optical carrier wave is modulated to be an intensity-modulated wave that "carries" information.

4. An electro-optical modulation Pockels cell: is an EOM based on Pockels effect. The Pockels effect refers to a photoelectric phenomenon in which the refractive index of a specific crystal is proportional to the strength of an applied electric field. By controlling the applied electric field, the refractive index in a certain direction is changed, wherein the electro-optical modulation Pockels cell may work as a variable half wave plate, so as to implement change of the polarization state. When the electro-optical modulation Pockels cell is placed between two vertical polarizers, light intensity modulation can be implemented. According to differences in the direction of voltage application, the Pockels effect can be divided into longitudinal Pockels effect and transverse Pockels effect. When the direction of voltage application is parallel to the direction of light propagation, it is called the longitudinal Pockels effect. When the direction of voltage application is perpendicular to the direction of light propagation, it is called the transverse Pockels effect.

5. A feedforward operation: feedforward is an information processing technique used for processing data that includes errors or incomplete data and providing meaningful answers. When applied to solve real-world problems, the technique may increase information processing speed.

6. A single photon detector (SPD): is an ultra-low noise device, configured to detect the smallest energy quantum in light, photon. The single photon detector can detect and count single photons through enhanced sensitivity, especially for emerging applications where the available signal intensity is only a few photon energy levels.

7. An optical collimator: is configured to convert a transmitted light ray in an optical fiber into a collimated light ray (parallel light ray), or to couple an external parallel (approximately parallel) light ray to a single mode optical fiber. The optical collimator can be based on a principle of precise positioning by a pigtail and a self-focusing lens.

8. A wave plate: is an optical device that generates an additional optical path difference (or phase difference) between two perpendicular optical vibrations. The wave plate is usually made of a birefringent crystal of a precise thickness, such as quartz, calcite, or mica, and has the optical axis parallel to a surface of the crystal.

9. A quarter-wave plate: also known as "a quarter-wave retarder", is an optical device that makes a phase difference of ¼ wavelength between outgoing ordinary light and extraordinary light when light of a certain wavelength is vertically incident thereon and passes therethrough. In an optical path, the quarter-wave plate is often configured to change linearly polarized light to circularly polarized light or elliptically polarized light, or, conversely, to change circularly polarized light or elliptically polarized light to linearly polarized light. The wave plate is usually made by cutting a birefringent material along a direction parallel to the optical axis into a plane-parallel plate, and its thickness is exactly an odd multiple of the product of the difference in refractive index between two main axes of the birefringent material and ¼ of a given wavelength. A wave plate that is made of an optically active material and can rotate the plane of polarization of incident light by an odd multiple of $\pi/2$ is also called a quarter-wave plate.

10. A field programmable gate array (FPGA): is a programmable logical array, and its basic structure includes a programmable input/output unit, a configurable logic block, a digital clock management module, an embedded block random access memory (RAM), a wiring resource, an embedded dedicated hard core, an underlying embedded function unit. FPGA is a product of further development on the basis of programmable devices such as programmable array logic (PAL) and generic array logic (GAL). FPGA appears as a semi-custom circuit in the field of application specific integrated circuit (ASIC), not only solves the shortage of a custom circuit, but also overcomes the shortcoming of the limited quantity of original programmable device gate circuits. Since FPGA has the characteristics of rich wiring resources, high repeatable programming, high integration and low investment, it has been widely used in the field of digital circuit design. The FPGA design process includes algorithm design, code simulation, and design, board debugging, designers and actual needs to establish an algorithm architecture, use electronic design automation (EDA) to establish a design plan or hardware to write a design code, through code simulation to ensure that the design plan meets actual requirements, and finally board level debugging, using a configuration circuit to download a relevant file to the FPGA chip to verify the actual running effect.

11. A polarizing beam splitter: is an optical device that uses a combined polarizing beam splitter to replace a conventional polarizer, so that an optical filter can emit two beams of polarized light having vibrations orthogonal to each other and having spectra complementary to each other, that is, produce two channels. A multi-channel birefringent filter can be obtained by combining multiple polarizing beam splitters. By adjusting channels of the multi-channel birefringent filter so that transmission bands of the channels are continuously distributed in a spectral region near a spectral line, a novel video spectrometer can be obtained.

12. An integrated photonics chip: is a chip obtained by integrating the light-emitting properties of indium phosphide and the optical routing capabilities of silicon into a single hybrid chip, and can be applied to a computer device based on photonics. When a voltage is applied to indium phosphide, the light enters a waveguide of the silicon chip to generate a continuous laser beam, which can drive other silicon photonic devices. This silicon-based laser technology can make photonics more widely used in computers because large-scale silicon-based manufacturing technology can greatly reduce costs. Although the technology is still a long way from commercialization, it is believed that dozens or even hundreds of hybrid silicon lasers will be integrated into a single silicon-based chip along with other silicon photonics components in the future. This marks the beginning of low-cost mass production of highly integrated silicon photonics chips.

13. A Rayleigh length: in optics and laser science, the Rayleigh length, or Rayleigh range, is the distance along the propagation direction of a beam from the waist to the place where the area of the cross section is doubled, and in this case, the cross-sectional radius is about 1.414 ($\sqrt{2}$) times the waist radius.

14. An active optical element: refers to an electronic element that change motion properties of photons (such as polarization, amplitude, etc.) through electrical energy. In this application, an active optical element refers to an EOM or an AOM, such as an electro-optical modulation Pockels cell.

Under a framework of MBQC, a quantum in a highly entangled cluster state is used as a computing resource. In an error correction method for feedforward measurement results, a drive feedforward is implemented based on a FPGA driving an ultra-high speed active optical element (1 MHz), that is, one active optical element is needed for each feedforward operation. In related art, when multiple photons are measured, the same quantity of active optical elements as photons are needed to measure the multiple photons respectively to obtain measurement results of the multiple photons. In this application, by shortening the spatial distances between light rays of photons, multiple photons can pass through the same active optical element, and the same active optical element can complete feedforward measurements of the multiple photons. For the purpose of changing the quantum computing structure, this application is to reduce the quantity of active optical elements that need to be used in a feedforward operation. By setting different propagation path lengths for multiple photons, the multiple photons have different time delays. When a photon propagates in an active optical element (such as an EOM), the polarization state of the photon is changed through refraction by an electro-optical crystal. Because the crystal structure of the electro-optical crystal is not completely uniform, reducing the spatial distances between light rays of multiple photons in a free space can make the multiple photons pass through a certain EOM separately, and after being modulated by the EOM, variations of the polarization states are basically the same. Therefore, the solution can minimize the effect of non-uniformity of the electro-optical crystal of the active optical element (such as an EOM) on polarization of multiple photons. Since a feedforward operation is also needed and qubits need to be delayed in a standard MBQC method, this solution does not incur additional time loss and computational frequency limitations under the condition that the quantity of photons to be measured remains unchanged. The technical solutions of this application are described below with reference to several embodiments.

FIG. 1 is a schematic diagram of an optical apparatus for quantum computing provided by one embodiment of this application. In some embodiments, the apparatus may also be called a multi-photon mode active optical feedforward system. The apparatus may include: a delay generation module 10, an optical fiber collimation module 20, a quasi-spatial mode generation module 30 and a feedforward measurement module 40. The feedforward measurement module 40 includes an active optical element 41 configured to modulate optical signals.

The delay generation module 10 is configured to generate different time delays for n photons respectively, so that the n photons arrive at the active optical element 41 at different times, n being an integer greater than 1.

Photons refer to a medium of electromagnetic interaction. In some embodiments, the n photons are in a highly entangled cluster state. In this solution, one photon is also called a single photon, and one qubit preferably corresponds to one single photon. In some embodiments, n=3 photons are used for testing, which proves that no other errors will be introduced in this system, and n can be a larger value. The maximum range of n is not limited in this application.

The time delays are caused by different propagation time lengths (i.e., durations) in the process of the n photons passing through the delay generation module 10. For example, in the case of n=3, photon 1, photon 2, and photon 3 are in a highly entangled cluster state. The propagation duration of the photon 1 in the delay generation module 10 is about $7.34*10^{-7}$ s; the propagation duration of the photon 2 in the delay generation module 10 is about $1.47*10^{-6}$ s; the propagation duration of the photon 3 in the delay generation module 10 is about $2.20*10^{-6}$ s. Due to different propagation durations of the three photons in the delay generation module 10, the three photons have different time delays. In the embodiments of this application, the time delay of a certain photon refers to the time difference between the moment when the photon enters the delay generation module 10 and the moment when the photon leaves the delay generation module 10, that is, the duration during which the photon propagates in the delay generation module 10.

The active optical element 41 refers to an electrical element capable of modulating photons. The active optical element 41 includes at least one of the following: an EOM and an AOM.

In some embodiments, the delay generation module 10 generates different time delays for the n photons, and the differences between the time delays of adjacent photons are the same, that is, for two adjacent photons, the difference between the former photon and the latter photon is a delay factor t. The value of the delay factor t depends on the speed of a feedforward operation, and the delay factor T is greater than or equal to the minimum time required for performing one feedforward operation. Two adjacent photons refer to two photons with the closest time delays among the n photons. For example, if n=4, the time delay of a photon A is about $1.51*10^{-6}$ s, the time delay of a photon B is about $4.56*10^{-6}$ s, the time delay of a photon C is about $3.02*10^{-6}$ s, and the time delay of a photon D is about $7.15*10^{-6}$ s, the photon A and the photon C are adjacent photons, the photon B and the photon C are adjacent photons, and the photon B and the photon D are adjacent photons.

The optical fiber collimation module 20 is configured to convert light rays of the n photons into n collimated light rays to propagate in a free space.

The n collimated light rays refers to n light rays that are parallel to each other and do not diverge. The free space refers to a space in which photons propagate freely. The free space may be an open space or a closed space, for example, an open space such as air and an outer space, and a closed space such as a closed chamber. In some embodiments, the optical fiber collimation module 20 includes at least: a pigtail and a lens. In some embodiments, for the sake of precise alignment and reduction of beam divergence, the focal length of the lens is 10 mm.

The quasi-spatial mode generation module 30 is configured to control the light rays of the n photons propagating in the free space to pass through the same active optical element 41 in sequence, and the active optical element 41 is configured to modulate optical signals of the n photons in sequence according to the time sequence in which the n photons arrive at the active optical element 41.

In some embodiments, the quasi-spatial mode generation module 30 enables the light rays of the n photons to pass through the same active optical element 41 in sequence by controlling the spatial distances between the light rays of the n photons. In some embodiments, the quasi-spatial mode generation module 30 can further adjust the propagation direction of the foregoing n photons. In some embodiments, a light ray of a photon is called a spatial mode and a photon path of the photon.

Figure 2:
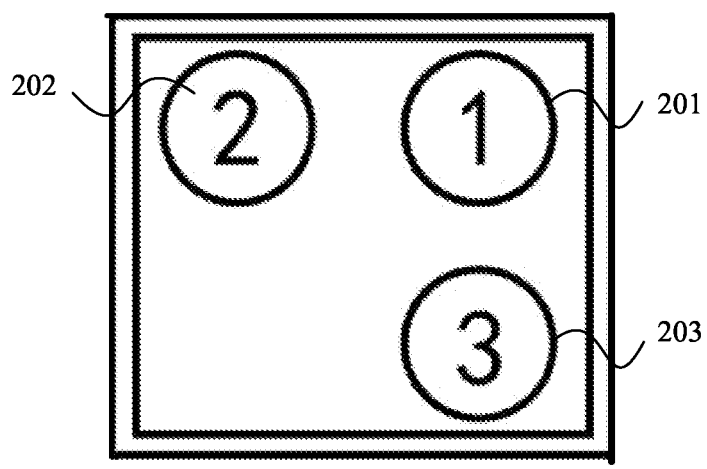
FIG. 2 is a schematic diagram of a position relationship between light rays of photons provided by one embodiment of this application.

In some embodiments, n=3, that is, there are three photons in a highly entangled cluster state, and the light rays of the three photons are aligned in a non-overlapping manner through the quasi-spatial mode generation module 30, that is, three quasi-spatial modes are generated for the three photons through free space element combination. Three quasi-spatial modes are generated for the three photons through the quasi-spatial mode generation module 30. As shown in FIG. 2, the propagation direction of the three photons is a direction perpendicular to a screen and inward. Cross sections of a light ray 201, a light ray 202 and a light ray 203 respectively corresponding to the three photons are arranged in a triangle, that is, lines connecting the cross sections of the light rays (especially the center points) form a triangle. Every two light rays are aligned parallel to each other in a non-overlapping manner, and the quasi-spatial modes minimize the differences in propagation environment during propagation of the photons. Thus, the quasi-spatial mode generation module 30 can change the spatial positions of the light rays of the n photons in the free space, so that the n photons can be modulated through the same active optical element. The spatial distances between the light rays of the photons are short (the spatial distances between the light rays of the photons can be less than the diameters of the light rays), which allows these photons to pass through the same active optical element in the same small position area. Because the crystal structure of the electro-optical crystal in the active optical element is not completely uniform, the electro-optical crystal has basically the same crystal structure in the same small position area, and the refraction capabilities are similar. Therefore, when multiple photons pass through the same active optical element in the same small position area, the effects of modulation on these photons by the active optical element 41 are basically the same, helping to avoid introducing new system errors.

The feedforward measurement module 40 is configured to perform polarimetry on a modulated optical signal of a first photon to obtain a measurement result of the first photon, the measurement result of the first photon being used for performing feedforward compensation or feedforward error correction on a measurement result of a second photon to be measured. The first photon is one of the n photons, and the second photon is a next photon to be measured after starting or completing measurement of the first photon.

The first photon may be any photon in the n photons, except the last photon arriving at feedforward measurement module 40. The feedforward measurement module 40 measures the optical signal of the first photon to obtain the measurement result of the first photon. In some embodiments, the measurement result includes polarization information of the first photon.

The second photon is the next photon arriving at the feedforward measurement module 40 after the first photon in the n photons. Since the n photons are in an entangled cluster state and the properties of the n photons affect each other, the measurement result of the first photon has an effect on the measurement result of the second photon. According to a relevant principle of quantum physics, before the measurement result of the first photon is obtained, the first photon has multiple measurement results having different probabilities. Once the feedforward measurement module 40 measures the first photon, the measurement result of the first photon collapses in probability, and the measurement result is converted from an uncertain result to a definite result. Since the first photon and the second photon are in an entangled state, the measurement result of the first photon has an effect on the measurement result of the second photon. The feedforward measurement module 40 is adjusted based on the measurement result of the first photon to implement compensation or correction.

In some embodiments, adjustment of the feedforward measurement module 40 based on the measurement result of the first photon is performed through an element capable of quick enabling/disabling. In some embodiments, through a wave plate and the active optical element 41 in an enabled/disabled state, the feedforward measurement module 40 can be adjusted based on the measurement result of the first photon, so as to perform feedforward compensation and feedforward error correction on the measurement result of the second photon to be measured. In some embodiments, the wave plate is a quarter-wave plate. In some cases, the photon polarization state is distorted after modulation by the active optical element 41. The distorted photon polarization state can be changed into a sinusoidal polarization state through the quarter-wave plate. After the second photon arrives at the feedforward measurement module 40, the second photon is measured through the adjusted feedforward measurement module 40 to obtain the measurement result of the second photon.

In some embodiments, the speed at which the feedforward operation is performed by the feedforward measurement module 40 is controlled by the active optical element 41, and is preferably related to the operating speed of the active optical element 41 or further preferably determined by the operating speed of the active optical element 41, and the maximum speed of the feedforward operation is further preferably the operating speed of the active optical element 41. In some embodiments, the enabling/disabling state of the active optical element 41 is controlled by a fast FPGA board.

To sum up, on the one hand, the delay generation module enables multiple photons in an entangled cluster state to have different time delays. On the other hand, the quasi-spatial mode generation module enables the light rays of the multiple photons to be in quasi-spatial modes which have very small spatial distances therebetween but do not overlap each other. The system only needs to use one active optical element to complete several quick feedforward operations, to implement measurement of multiple photons, and obtain multiple corresponding measurement results respectively. The time delays respectively corresponding to the multiple photons are different, so that different photons arrive at the feedforward measurement module at different times. The feedforward measurement module uses the interval between times of arrival of adjacent photons to perform a feedforward operation on the previous photon. Since the same feedforward measurement module can obtain, by measurement, measurement results of multiple photons in an entangled state, the quantity of active optical elements needed is reduced when the quantity of measured photons remains at least unchanged, which helps to reduce the design difficulty of quantum equipment and reduce cost of the quantum equipment.

In addition, because the multiple photons arrive at the feedforward measurement module one by one, and the interval between times of arrival of the photons is small, the feedforward measurement module can perform feedforward operations at a high speed, without reducing the rate and computing accuracy of quantum computing and the security in the case of a cryptographic protocol, and without affecting the universality of quantum computing.

An optical apparatus for quantum computing are described below with reference to several embodiments.

In some embodiments, a difference between a time delay of a first photon and a time delay of a second photon is related to time consumption of a feedforward operation.

The feedforward operation is performed in a feedforward measurement module. In some embodiments, the time consumption of the feedforward operation refers to the time consumed by performing the feedforward operation on a single photon. The time consumption of the feedforward operation is related to the speed of the feedforward operation. The feedforward operation at least includes a process of measuring polarization of a single photon and a process of adjusting the feedforward measurement module based on a measurement result of the single photon. The time consumption of the feedforward operation is related to processing time consumption of an active optical element. The time consumption of the feedforward operation at least includes: a measurement time of the first photon by the feedforward measurement module and a modulation time of a photon by the active optical element. In order to further reduce time delays generated by the optical apparatus for quantum computing in a process of obtaining measurement results of n photons, a delay generation module controls the difference between time delays of the first photon and the second photon, and makes the difference equal to or slightly greater than the measurement time of the first photon by the feedforward measurement module plus the modulation time of the photon by the active optical element, so that the optical apparatus for quantum computing can obtain measurement results of photons and perform feedforward operations without interruption.

In some embodiments, a quasi-spatial mode generation module includes at least one lens module, and the lens module is configured to converge light rays of the n photons and then emit in the form of n collimated light rays to reduce spatial distances between the light rays of the n photons.

A certain photon needs to pass through at least one lens module in a process of passing through the quasi-spatial mode generation module. The spatial position of the light ray of the photon is changed through refraction by the lens module. Before entering the quasi-spatial mode generation module, the n photons need pass through the delay generation module. Therefore, the moments when the n photons arrive at the quasi-spatial mode generation module are different. In some embodiments, when more than one lens modules are included in the quasi-spatial mode generation module, the n photons separately sequentially pass through lens modules in the propagation direction in chronological order. The n photons are separately refracted by at least one lens module in the quasi-spatial mode generation module, so that the spatial positions of the light rays of the n photons in the free space are closer, and the light rays are still parallel. The corresponding light rays of these photons have very small spatial distances therebetween and do not coincide perfectly, which allows the photons to pass through the same active optical element. Further, these photons can pass through the active optical element from the same small position area, thus, the active optical element has basically similar modulation effects on the n photons, and no new computing error is introduced in a process of measuring corresponding measurement results of the n photons.

In some embodiments, each lens module includes a first lens and a second lens. The first lens is configured to converge the light rays of the n photons. The second lens is configured to convert the light rays of the n photons having passed through the first lens into the form of the n collimated light rays to emit.

In an example, in a certain lens module, the first lens is a convex lens, and the second lens is a concave lens. As shown in the lens module 310 in FIG. 3, the distance between a center point of the first lens 311 and a center point of the second lens 312 is equal to a focal length of the first lens 311 minus a focal length of the second lens 312. Since the first lens 311 is a convex lens, when a certain photon passes through the first lens 311, the light ray of the photon will be deflected to the direction of the optical axis of the first lens 311 through convergence by the convex lens. Then, the photon continues to propagate and pass through the second lens 312. Since the second lens 312 is a concave lens, the direction of the light ray of the photon changes through divergence by the concave lens. In some embodiments, the light ray of the photon is parallel to the optical axis of the first lens 311 (or the second lens 312) before and after passing through the lens module 310. After a certain photon passes through one lens module, the spatial distance between the light ray of the photon and the optical axis of the lenses in the lens module decreases.

Figure 3:
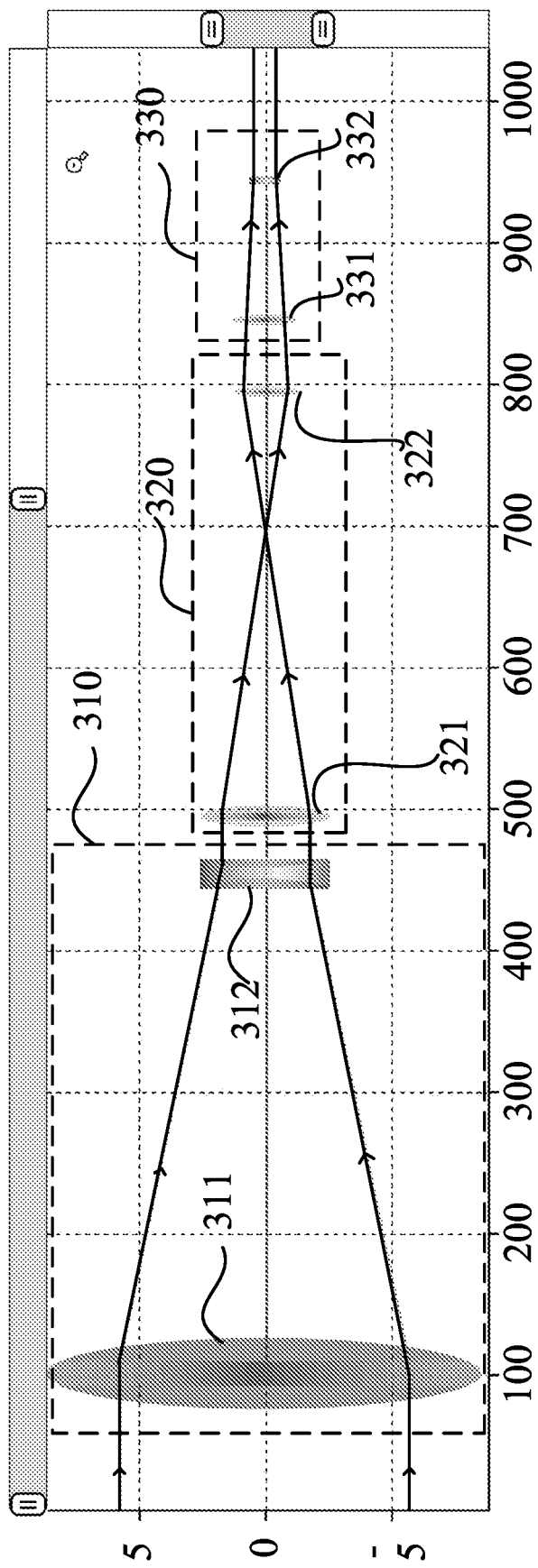
FIG. 3 is a schematic diagram of three lens modules in a quasi-spatial mode generation module provided by one embodiment of this application.

In another example, in a certain lens module, the first lens is a convex lens and the second lens is a concave lens, as shown in the lens module 320 in FIG. 3, the distance between a center point of the first lens 321 and a center point of the second lens 322 is equal to a focal length of the first lens 321 plus a focal length of the second lens 322. In some embodiments, through convergence by the first lens 321 and the second lens 322, the spatial distances between the light rays of the n photons are closer to the optical axis of the first lens 321 (or the second lens 322) separately, that is, the spatial distances between the light rays of the n photons are smaller.

As shown in FIG. 3, in some embodiments, three lens modules are provided in the quasi-spatial mode generation module, namely, a lens module 310, a lens module 320, and a lens module 330. The first lens 311 in the lens module 310 is a convex lens, and the second lens 312 is a concave lens. The first lens 321 in the lens module 320 is a convex lens, and the second lens 322 is a concave lens. The first lens 331 in the lens module 330 is a convex lens, and the second lens 332 is a concave lens. The three lens modules are placed in sequence in the propagation direction of the photons. The n photons enter the quasi-spatial mode generation module in chronological order. For any one of the n photons, the photon passes through the lens module 310, the lens module 320 and the lens module 330 in the propagation direction in sequence. Through convergence by the lens modules, the spatial distances between the light rays corresponding to the n photons (less than the diameters of the light rays of the photons) reach a good effect that the light rays are close to each other and do not overlap. After many experiments, in a case of n=3, the above three lens modules can make the light rays of the three photons have suitable spatial distances therebetween, and the light rays of the three photons parallel to each other in quasi-spatial modes. The three photons can smoothly pass through the same active optical element 41 through convergence by the three lens modules.

The quasi-spatial modes of the n photons are parallel to each other in a process that the feedforward measurement model performs feedforward operations on the n photons in sequence. Providing at least one lens module in the quasi-spatial mode generation module, it is beneficial to increasing the Rayleigh length and improving the fault-tolerant capability of the optical apparatus for quantum computing.

Figure 4:
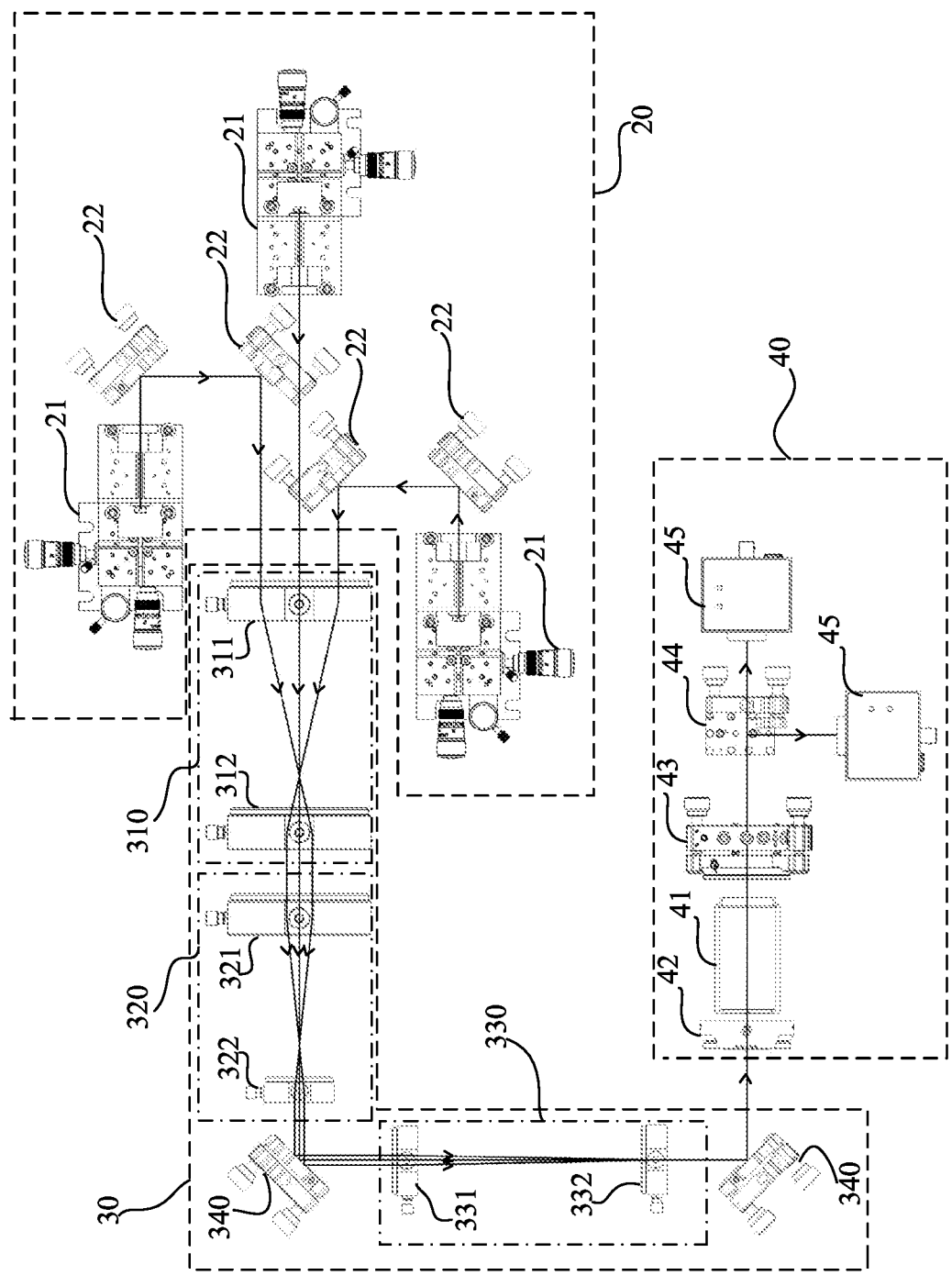
FIG. 4 is a structural schematic diagram of an optical apparatus for quantum computing provided by one embodiment of this application.

In some embodiments, the quasi-spatial mode generation module further includes other adaptive optical devices. In some embodiments, the other adaptive optical devices at least include: an adaptive mirror. As shown in FIG. 4, the adaptive mirror 340 is configured to change a propagation direction of photons. In some embodiments, the placement direction of the adaptive mirror 340 is 45° from the propagation direction of the photons, and the propagation direction of the photons is rotated by 90° through refraction by the adaptive mirror 340.

By changing the propagation direction of the photons through the adaptive mirror 340, the length of the quasi-spatial mode generation module can be effectively reduced, which helps to reduce the size of the optical apparatus for quantum computing. The adaptive mirror 340 can generate a large quantity of high-quality quasi-spatial modes.

In some embodiment, the delay generation module includes n optical fiber loops, and the n optical fiber loops have one-to-one correspondence to the n photons. The n optical fiber loops are configured to generate different time delays for the n photons respectively.

In some embodiment, the n optical fiber loops have different optical fiber lengths.

Optical fiber loops corresponding to different photons have different optical fiber lengths. If an optical fiber loop corresponding to a certain photon is longer, the time delay of the photon is larger. If an optical fiber loop corresponding to a certain photon is shorter, the time delay of the photon is smaller. For example, in the case of n=3, the delay generation module includes three optical fiber loops. Lengths of the three optical fiber loops are 220 m, 440 m, and 660 m respectively, and the time delays are t(660)>t(440)>t(220). Taking t(660) as an example, t(660) refers to the time delay of the photon propagating in the optical fiber loop having a length of 660 m. The time delay of the photon can be controlled by changing the length of the optical fiber loop. In some embodiments, the difference between the time delays of the first photon and the second photon is called a delay factor $\tau$. The minimum value of the delay factor $\tau$ is related to the operating speed of the active optical element. In some embodiments, the delay factor $\tau$ is limited to 1/(1 MHz). When an active optical element having a higher operating speed is used, the delay factor $\tau$ can be set even smaller. In a current state of the art, the operating speed of the active optical element is allowed to reach the level of tens of megahertz, which can further reduce the value of the delay factor $\tau$. The specific range of the delay factor $\tau$ is not limited herein. In some embodiments, the lengths of the optical fiber loops can be set according to the value range of the delay factor $\tau$. In some embodiments, the time delay of a certain photon is related to its corresponding optical fiber loop and the propagation speed of the photon. The optical fiber loops are configured to control different photons to have different time delays, and to avoid changing other properties of the photons, so that the photons arrive at the active optical element at different times, and the active optical element can modulate the photons in sequence.

In some embodiments, the optical fiber loops are isolated from an environment temperature. Since the temperature affects the polarization states of photons, the isolation of the optical fiber loops from the environment temperature can avoid change of the polarization states of the photons in the process of propagating in the optical fiber loops as much as possible, which helps to improve the accuracy of measurement results of photon polarization by the optical apparatus for quantum computing.

In some embodiment, the optical fiber collimation module includes n optical collimators, and the n optical collimators have one-to-one correspondence to the n optical fiber loops. A target optical collimator in the n optical collimators is configured to convert the light ray of a photon in a target optical fiber loop into a collimated light ray to propagate in the free space. The target optical fiber loop is an optical fiber loop corresponding to the target optical collimator in the n optical fiber loops.

For a certain photon, the photon propagates in a corresponding optical fiber loop. After leaving the optical fiber loop, through the target optical collimator in the optical fiber collimation module, the photon is converted into a collimated light ray and emitted from the target collimator and propagates in the free space. The n optical collimators can convert the light rays of the n photons into n collimated light rays, so that the light rays of any two photons are parallel to each other.

In some embodiments, the feedforward measurement module includes: a first polarizing beam splitter, an active optical element, a wave plate, a second polarizing beam splitter, a detector, and a driver of the active optical element. The first polarizing beam splitter is configured to obtain photons of a first polarization state. The active optical element is configured to change a polarization state of the photons of the first polarization state to obtain photons of a second polarization state. The wave plate and the second polarizing beam splitter are configured to separate a photon of at least one single polarization state from the photons of the second polarization state. The detector is configured to detect light intensity of the photon of at least one single polarization state.

The first polarizing beam splitter and the second polarizing beam splitter are configured to filter for photons with specific polarization states respectively. Taking the first polarizing beam splitter being configured to filter for photons with horizontal polarization as an example, the first polarizing beam splitter only allows photons of a horizontal polarization state to continue to propagate along the original propagation direction of the photons, so as to implement the effect of filtering for photons with a specific polarization state. In some embodiments, the first polarizing beam splitter can change the propagation direction of photons with other polarization states, or absorb the photons. In some embodiments, the first polarizing beam splitter and the second polarizing beam splitter can filter for photons with the same polarization state, or filter for photons with different polarization states. The active optical element modulates the photons by changing the polarization state of the photons passing through the active optical element. Since the distances between the n collimated light rays formed by the light rays of the n photons are very small when the photons separately pass through the quasi-spatial mode generation module, these photons undergo the same polarization rotation in the active optical element of the feedforward measurement module. In some embodiments, in the case of quantum coding based on polarization information, the active optical element may be an EOM. By adjusting a voltage across the EOM, the refractive index of an electro-optical crystal in the EOM can be changed, thus affecting the vibration state of photons passing through the EOM. In some cases, when the EOM is placed between two perpendicular polarizing beam splitters, light intensity modulation can be implemented by adjusting the voltage of the EOM. At this time, the EOM is equivalent to a half wave plate. In other embodiments, in the case of quantum coding based on path information, the active optical element refers to an AOM. In some embodiments, the wave plate is a quarter-wave plate, and the wave plate rotates in steps of 5°. In some embodiments, the feedforward measurement module includes two detectors, and the two detectors are configured to detect single photons of different polarization states. In some embodiments, the detector includes a photodiode or other devices capable of detecting single photons. An initial logic name of the first detector is "0", and an initial logic name of the second detector is "1". The logic names are numbers used for distinguishing the first detector from the second detector. When the two detectors have the initial logic names, the measurement result of the feedforward measurement module is 0 when the first detector detects a single photon, and the measurement result of the feedforward measurement module is 1 when the second detector detects a single photon. After changing the logic names of the two detectors (equivalent to exchanging the logical names of the two detectors), the logical name of the first detector is changed to 1 and the logical name of the second detector is changed to 0. After exchanging the logical names of the two detectors, the measurement result of the feedforward measurement module is 1 when the first detector detects a single photon, and the measurement result of the feedforward measurement module is 0 when the second detector detects a single photon. By exchanging the names of the first detector and the second detector, a bit rotation gate function is implemented on a qubit. The quantum rotation gate implemented by the above method has a high running speed and is technically easy to implement.

In some embodiments, after a certain photon enters the feedforward measurement module, the photon can pass through the first polarizing beam splitter, the active optical element, the wave plate, and the second polarizing beam splitter in sequence, and finally arrives at the detector.

An optical apparatus for quantum measurement provided in this application can measure the rotation angles of polarization of single photons through only a quarter-wave plate, an active optical element (such as a Pockels cell) and two detectors with interchangeable logic names. In one embodiment, the opportunity to measure four polarization angles of photons may be obtained by enabling/disabling the active optical element and exchanging the logic names of the first detector and second detector. The opportunity to measure the four polarization angles of photons is implemented by respectively changing the enabling/disabling state of the active optical element and exchanging the states of the first detector and the second detector, specifically as follows:

1. enabling the active optical element 41, and using initial logic names of the first detector and the second detector;
2. disabling the active optical element 41, and using the initial logic names of the first detector and the second detector;

3. enabling the active optical element 41, and exchanging the initial logic names of the first detector and the second detector; and 4. disabling the active optical element 41, and exchanging the initial logic names of the first detector and the second detector.

In some embodiments, using more complex active optical element controllers can increase the quantity of measurable polarization angles, so that this system can be closer to universal quantum computing.

FIG. 4 is a schematic diagram of an optical apparatus for quantum computing provided by one embodiment of this application.

In some embodiments, three photons in a highly entangled cluster state respectively enter optical fiber loops of different lengths in a delay generation module (not shown in the drawing) to propagate. The optical fiber loops of different lengths make the propagation times of the three photons in the optical fiber loop different, generating different time delays. After leaving the delay generation module, the photons enter an optical collimator module 20, and at least three target optical collimators 21 are included in the optical fiber collimation module 20. The three photons enter corresponding target optical collimators respectively, and light rays of the three photons are converted into collimated light rays through the optical collimators. The light rays of the three photons propagate parallel to each other in a free space, and enter a quasi-spatial mode generation module 30 in chronological order. In some embodiments, the spatial position of the light ray of a certain photon needs to be changed through refraction by a plane mirror 22 in the optical fiber collimation module, so that the photon can enter the quasi-spatial mode generation module 30. The three photons separately pass through three lens modules in the propagation direction in the quasi-spatial mode generation module 30 in sequence. The three photons form quasi-spatial modes with very small spatial distances there between and parallel to each other through convergence by the three lens modules 310, 320 and 330 respectively. The quasi-spatial modes respectively corresponding to the three photons have very small spatial distances therebetween and do not overlap. In some embodiments, the quasi-spatial mode generation module 30 further includes other adaptive optical elements, such as plane mirrors 340. The adaptive plane mirrors 340 are configured to change the propagation directions of the photons. Since the time delays generated for the three photons in the delay generation module are different, the times at which the three photons arrive at a feedforward measurement module 40 are different. The feedforward measurement module 40 completes a feedforward operation on the first photon by using the difference between the delay times of the first photon and the second photon. In some embodiments, a first polarizing beam splitter 42 in the feedforward measurement module 40 allows only photons in a horizontal polarization state to pass through. After a certain photon passes through the first polarizing beam splitter 42, the photon continues to propagate in the original direction to arrive at an active optical element 41. In some embodiments, the active optical element 41 is an EOM, and the refractive index of an electro-optical crystal in the EOM can be changed by changing the voltage across the two poles of the EOM, thus changing the polarization state of the photon. The modulated photon is sequentially filtered through a quarter-wave plate 43 with a step of 5° and a second polarizing beam splitter 44. A detector 45 can detect whether a certain photon arrives at its surface. According to a detection result of the detector 45, polarization of the photon can be determined and a measurement result corresponding to the photon can be generated.

The key elements in a multi-photon mode active optical feedforward system are described below.

1. The optical fiber loops in the delay generation module use 780 HP optical fiber with a ferrule connector (FC)/a physical contact (PC) connector, and such an optical fiber has the minimum loss at a given wavelength (800 nm). The delay factor τ is determined by the speed of the feedforward operation as 1/(1 MHZ). In the above embodiment, the lengths of the three optical fiber loops are 220 m, 440 m, and 660 m. The optical fiber type used in the optical apparatus for quantum computing depends on the wavelength of qubits to be measured, and the lengths of the optical fiber loops depend on the speed at which feedforward operations are performed by the feedforward measurement module.

2. Lenses in at least one lens module of the quasi-spatial mode generation module are made of a boron-coated ultra-violet silicon lens material, which can reduce the loss caused by a photon passing through the lenses. In the foregoing embodiments, for the parameters of the lenses in each lens module, reference may be made to Table 1: design table of lens groups in a quasi-spatial mode generation module.

TABLE 1

Design table of lens groups in a quasi-spatial mode generation module

| Lens position number (corresponding to FIG. 3) | Lens focal length (mm) | Lens interval (mm) | Distance of spatial mode at optical element (mm) | Divergence angle of spatial mode (mRad) | Rayleigh length (mm) of single spatial mode |
|---|---|---|---|---|---|
| 311 | 500 | 106 | 11.5 | 23 | 2.174 |
| 312 | −150 | 350 | 3.45 | 0.333 | 10350 |
| 321 | 200 | 40 | 3.45 | 17.25 | 3.865 |
| 322 | 100 | 300 | 1.727 | 0.667 | 2587.5 |
| 331 | 200 | 50 | 1.725 | 8.669 | 15.303 |
| 332 | −100 | 100 | 0.864 | 1.333 | 648.875 |

3. Pockels cell: this system uses a double KTP crystal Pockels cell, and the specifications of the Pockels cell are: the crystal size: 6×6×10 mm, the diameter: 25.4 mm, the length: 42.2 mm, the CA diameter: 5.5 mm, the transmittance >98%@790 nm.

4. Pockels cell driver: the specifications of a Pockels cell driver used in this system are: the working voltage is 2.9 kV and the repetition rate is 1 MHz.

5. FPGA: the specifications of an FPGA used in this system are: 1 GB 1800 Mbps on-board DDR3, fully filled 400-pin FMCH Pockels cell interface, and 5 Pmod ports.

The feasibility of this application is proved below by experimental data of three photons in a highly entangled cluster state in the foregoing optical apparatus for quantum computing.

1. Characterization of quasi-spatial modes and beam diameters.

Figure 5:
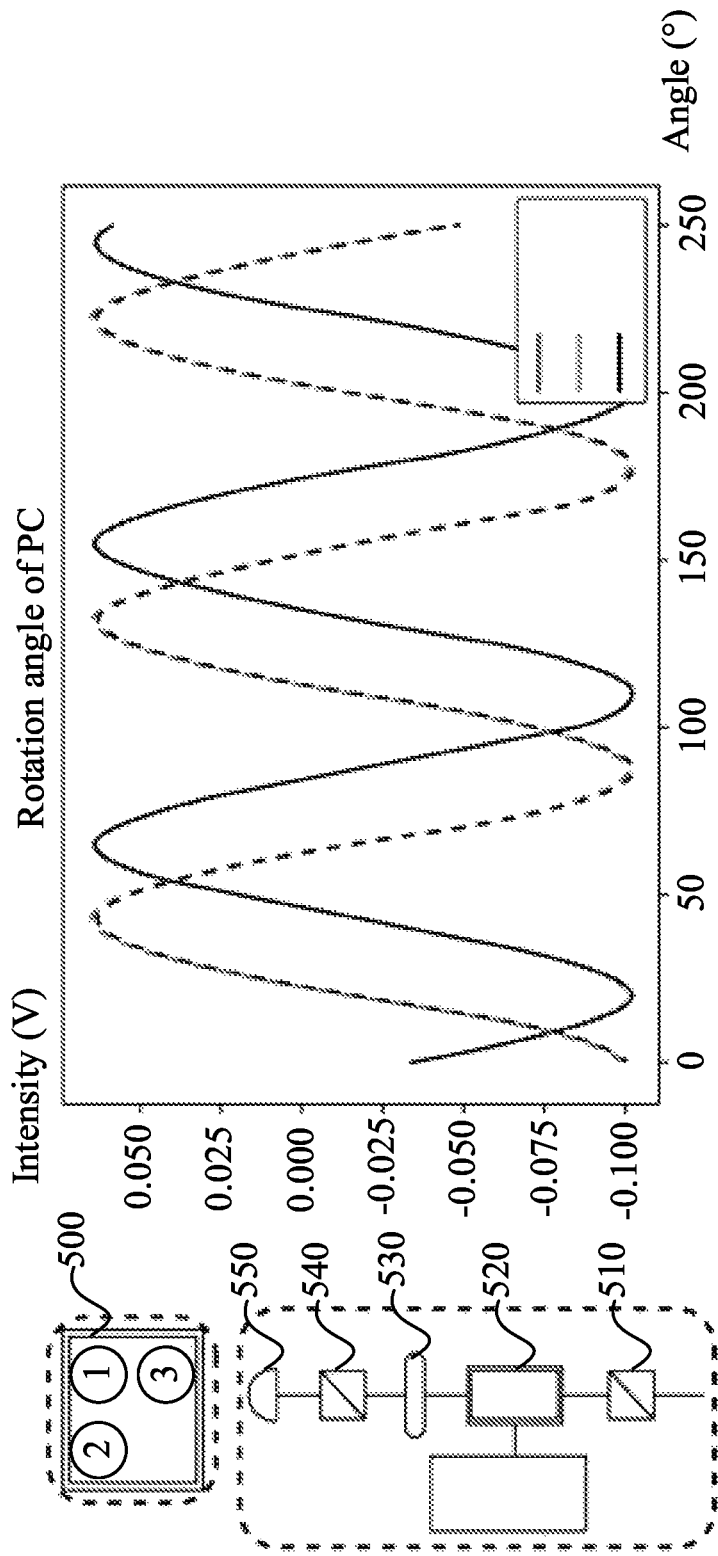
FIG. 5 is a schematic diagram of a composition of a feedforward measurement module and a relationship between an angle of a Pockels cell and light intensity provided by one embodiment of this application.

Data of the diameters of light rays of the photons and corresponding quasi-spatial modes of the three photons are measured by laser and WinCamD (far infrared spot analyzer) produced by DataRay. Related data of the diameters d1, d2 and d3 of the three light rays and the distances D12, D23 and D13 between the three light rays (for the corresponding serial numbers of the light rays of the three photons and the position relationships between the three light rays, please refer to 500 in FIG. 5) are shown as follows.

The diameters of the light rays of the photons:

$d1 = (219 \pm 3)$ μm $d2 = (237 \pm 3)$ μm $d3 = (261 \pm 3)$ μm

The distances between the light rays:

$D12 = (749.52 \pm 0.71)$ μm $D13 = (713.81 \pm 0.71)$ μm $D23 = (1047.53 \pm 0.71)$ μm

2. Characterization of change of angles of light rays of photons by a Pockels cell.

In order to align angle transformations applied to light rays of photons by a Pockels cell, referring to FIG. 5, laser is used again and two polarizing beam splitters and a half wave plate are used in a feedforward measurement module. A first polarizing beam splitter 510 before a Pockels cell 520 is configured to filter the photons (filter for photons with a specific polarization state), ensuring that only initially horizontally polarized photons are a part of the characterization. Subsequently, these photons pass through the Pockels cell 520 and a half wave plate 530 rotating in steps of 5°. A second polarizing beam splitter 540 filters (polarizes) the photons again before a photodiode 550. For any position to which the half wave plate 530 is rotated, the photodiode 550 measures the intensities of the photons as the Pockels cell is enabled and disabled. The angle set by the Pockels cell 520 is determined by the phase between two intensity functions. The Pockels cell 520 (KTP (KTIOPO$_4$, potassium titanyl phosphate) crystal at an angle of 0=) 22.5° is placed as a half wave plate and converts photons in three different beam paths from horizontal to diagonal polarization.

$\theta1 = (22.569 \pm 0.125)°$ $\theta2 = (22.581 \pm 0.125)°$ $\theta3 = (22.597 \pm 0.125)°$ The reason for the different angles is the possible step of a PCB motor controlling the half wave plate.

3. Characterization of angles of three different beams (light rays corresponding to three photons) passing through the Pockels cell.

Figure 6:
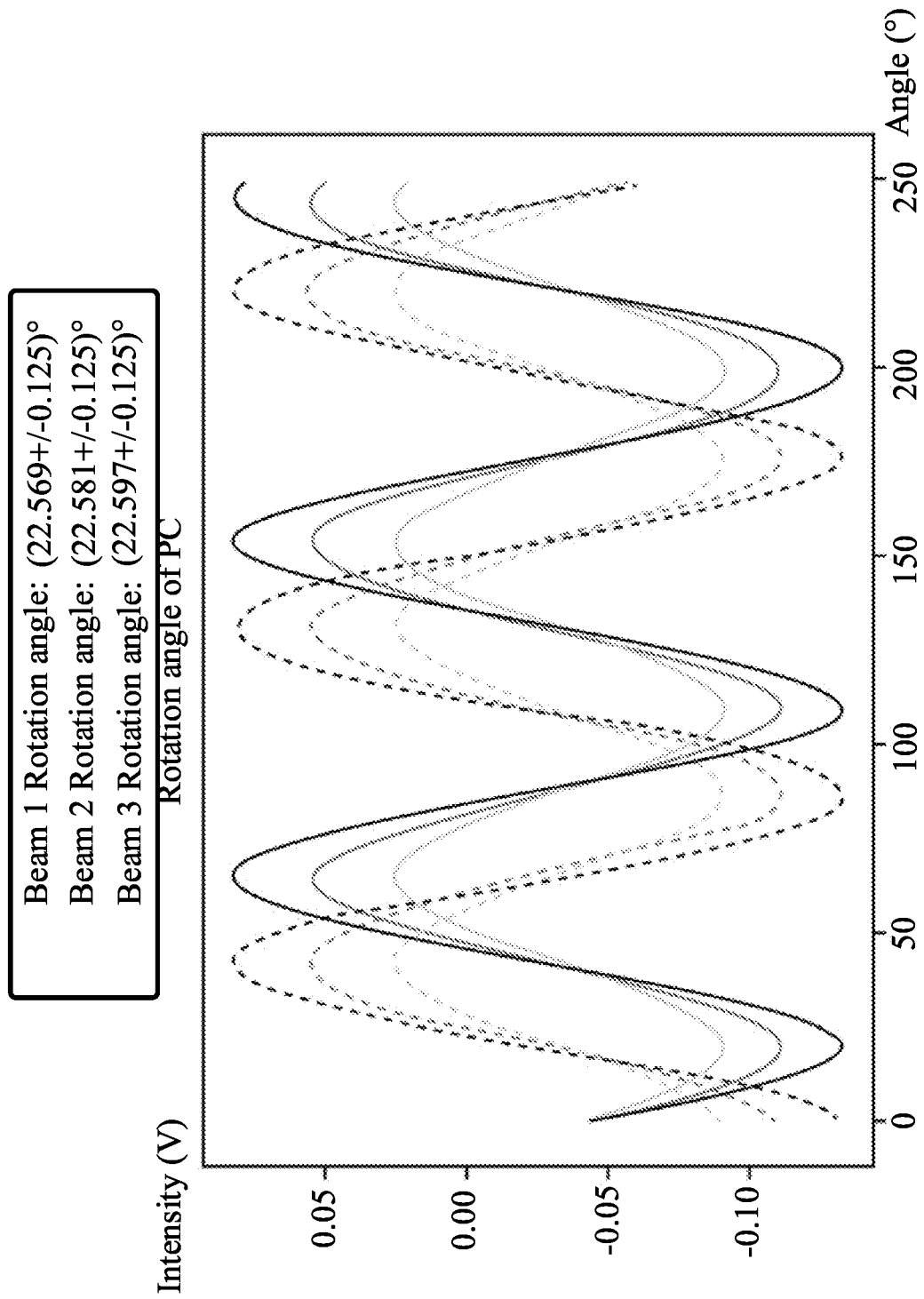
FIG. 6 is a schematic diagram of a relationship between an intensity function measured by a photodiode and an angle of a Pockels cell provided by one embodiment of this application.

FIG. 6 shows relationships between intensity functions measured by a photodiode and angles of rotation of a Pockels cell.

In order to understand clearer, dashed lines are used in FIG. 6 to show intensity measurement fitting functions when the Pockels cell is disabled. The Pockels cell deflects all the beams equally. The Pockels cell acts as a half wave plate with an angle of $\theta = (22.582 \pm 0.125)°$. An error is caused by the possible step of a PCB motor controlling the half wave plate. In order to distinguish six wave functions in FIG. 6, the amplitude of beam 1 is multiplied by 0.7, the amplitude of beam 2 is multiplied by 1.3, and the amplitude of beam 3 is unchanged.

An exemplary embodiment of this application provides a quantum computing system, which includes the optical apparatus for quantum computing described in the foregoing embodiments.

In some embodiments, the system further includes an entangled photon generation module and a measurement error correction module.

The entangled photon generation module is configured to generate a photon cluster having n photons in a highly entangled state. In some embodiments, the entangled photon generation module at least includes: an ultraviolet generator and a photon generation crystal. In some embodiments, a cluster of four photons in a highly entangled state can be generated by irradiating the surface of the photon generation crystal by the ultraviolet generator.

The measurement error correction module is configured to perform error correction on measurement results of photon polarization measured by the optical apparatus for quantum computing. In some embodiments, polarization information of a certain photon includes three components (quantum states) in its spatial position. In some embodiments, in the case of n=3, polarization information of a certain photon is stored in a certain component of polarization information of the other two photons. Through quantum computing of the polarization information of the other two photons, whether there is an error in the measurement result of the photon can be determined, so as to implement an error correction process.

The following are method embodiments of this application, and the method embodiments may be implemented through the apparatus provided by this application. For details not disclosed in the method embodiments of this application, reference may be made to the apparatus embodiments of this application.

An exemplary embodiment of this application provides a multi-photon mode active optical feedforward method, which is applied in an optical apparatus for quantum computing. The apparatus includes: a delay generation module, an optical fiber collimation module, a quasi-spatial mode generation module and a feedforward measurement module. The feedforward measurement module includes an active optical element configured to modulate optical signals. The method may include the following steps:

1. generating, by the delay generation module, different time delays for n photons respectively, so that the n photons arrive at the active optical element at different times respectively, n being an integer greater than 1;
2. converting, by the optical fiber collimation module, light rays of the n photons into n collimated light rays to propagate in a free space;
3. controlling, by the quasi-spatial mode generation module, the light rays of the n photons propagating in the free space to pass through the same active optical element in sequence, the active optical element being configured to modulate optical signals of the n photons in sequence according to the time sequence in which the n photons arrive at the active optical element; and
4. performing, by the feedforward measurement module, measurement on a modulated optical signal of a first photon to obtain a measurement result of the first photon, the measurement result of the first photon being used for performing feedforward compensation or feedforward error correction on a measurement result of a second photon to be measured; the first photon being one of the n photons, and the second photon being a next photon to be measured of the first photon.

In some embodiments, a difference between the time delay of the first photon and the time delay of the second photon is related to time consumption of a feedforward operation.

In some embodiments, the quasi-spatial mode generation module includes at least one lens module, and the lens module reduces spatial distances between the light rays of the n photons.

In some embodiments, the lens module is configured to converge the light rays of the n photons and then emit the light rays in the form of n collimated light rays.

In some embodiments, each lens module includes a first lens and a second lens. The first lens is configured to converge the light rays of the n photons. The second lens is configured to convert the light rays of the n photons having passed through the first lens into the form of the n collimated light rays to emit.

In some embodiments, the first lens is a convex lens, and the second lens is a concave lens or a convex lens.

In some embodiment, the delay generation module includes n optical fiber loops, and the n optical fiber loops have one-to-one correspondence to the n photons. The n optical fiber loops are configured to generate different time delays for the n photons respectively.

In some embodiment, the n optical fiber loops have different optical fiber lengths.

In some embodiment, the optical fiber collimation module includes n optical collimators, and the n optical collimators have one-to-one correspondence to the n optical fiber loops. A target optical collimator in the n optical collimators is configured to convert the light ray of a photon in a target optical fiber loop into a collimated light ray to propagate in the free space. The target optical fiber loop is an optical fiber loop corresponding to the target optical collimator in the n optical fiber loops.

In some embodiments, the delay generation module is isolated from environment temperature, so as to maintain the polarization state of each photon during a delay operation.

In some embodiments, the feedforward measurement module includes: a first polarizing beam splitter, the active optical element, a wave plate, a second polarizing beam splitter, a detector, and a driver of the active optical element. The first polarizing beam splitter is configured to obtain photons of a first polarization state. The active optical element is configured to change a polarization state of the photons of the first polarization state to obtain photons of a second polarization state. The wave plate and the second polarizing beam splitter are configured to separate a photon of at least one single polarization state from the photons of the second polarization state. The detector is configured to detect light intensity of the photon of at least one single polarization state.

In some embodiments, the active optical element includes an EOM.

The delay generation module enables multiple photons in an entangled cluster state to have different time delays, and the quasi-spatial mode generation module enables the multiple photons to be in quasi-spatial modes which have very small spatial distances therebetween and do not overlap, so that the system can complete several quick feedforward operations by only using one active optical element, to implement separate measurement of multiple photons, and obtain corresponding measurement results of the multiple photons respectively. The time delays of the multiple photons are different, so that different photons arrive at the feedforward measurement module at different times. The feedforward measurement module performs measurement by using the interval between times of arrival of adjacent photons to obtain measurement results, and adjusts the system based on the measurement results to implement feedforward compensation or correction. Since the same feedforward measurement module can obtain, by measurement, measurement results of multiple photons in an entangled state, the quantity of active optical elements used in the computing process is reduced when the quantity of measured photons remains at least unchanged, which helps to reduce the design difficulty of quantum equipment and reduce cost of the quantum equipment.

The embodiments of this application further provide a non-transitory computer-readable storage medium. The computer-readable storage medium has a computer program stored therein, and the computer program is loaded and executed by a processor to implement the multi-photon mode active optical feedforward method provided by the method embodiments above.

In some embodiments, the computer readable storage medium may include: a read-only memory (ROM), a random-access memory (RAM), a solid state drive (SSD), or an optical disk, etc. The RAM may include a resistance random access memory (ReRAM) and a dynamic random access memory (DRAM).

The embodiments of this application further provide a computer program product. The computer program product includes a computer program, and the computer program is loaded and executed by a processor to implement the multi-photon mode active optical feedforward method provided by the method embodiments above.

It is to be understood that the word "multiple" mentioned herein means two or more. In addition, the step numbers described herein merely exemplarily show a possible execution sequence of the steps. In some other embodiments, the steps may not be performed according to the number sequence. For example, two steps with different numbers may be performed simultaneously, or two steps with different numbers may be performed according to a sequence contrary to the sequence shown in the drawing. This is not limited in the embodiments of this application.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing descriptions are merely exemplary embodiments of this application, but are not intended to limit this application. Any modification, equivalent replacement, or improvement made within the spirit and principle of this application shall fall within the protection scope of this application.

What is claimed is:

1. An optical apparatus for quantum computing, comprising: a delay generation module, an optical fiber collimation module, a quasi-spatial mode generation module and a feedforward measurement module, the feedforward measurement module comprising an active optical element configured to modulate optical signals: wherein:
the delay generation module is configured to generate different time delays for n photons respectively, so that the n photons arrive at the active optical element at different times respectively, n being an integer greater than 1;

the optical fiber collimation module is configured to convert light rays of the n photons into n collimated light rays to propagate in a free space;

the quasi-spatial mode generation module is configured to control the light rays of the n photons propagating in the free space to pass through the same active optical element in sequence, and the active optical element being configured to modulate optical signals of the n photons in sequence according to a time sequence in which the n photons arrive at the active optical element; and the feedforward measurement module is configured to perform polarimetry on a modulated optical signal of a first photon to obtain a measurement result of the first photon, the measurement result of the first photon being used for performing feedforward compensation or feedforward error correction on a measurement result of a second photon to be measured: the first photon being one of the n photons, and the second photon being a next photon to be measured of the first photon.

2. The apparatus according to claim 1, wherein a difference between a time delay of the first photon and a time delay of the second photon is related to time consumption of a feedforward operation.

3. The apparatus according to claim 1, wherein the quasi-spatial mode generation module comprises at least one lens module, and the lens module is configured to reduce spatial distances between the light rays of the n photons.

4. The apparatus according to claim 3, wherein the lens module is configured to converge the light rays of the n photons and then emit the light rays in the form of the n collimated light rays.

5. The apparatus according to claim 3, wherein each lens module comprises a first lens and a second lens:
the first lens is configured to converge the light rays of the n photons; and
the second lens is configured to convert the light rays of the n photons having passed through the first lens into the form of the n collimated light rays to emit.

6. The apparatus according to claim 5, wherein the first lens is a convex lens, and the second lens is a concave lens or a convex lens.

7. The apparatus according to claim 1, wherein the delay generation module comprises n optical fiber loops, and the n optical fiber loops have one-to-one correspondence to the n photons; and
the n optical fiber loops are configured to generate different time delays for the n photons respectively.

8. The apparatus according to claim 7, wherein the n optical fiber loops have different optical fiber lengths.

9. The apparatus according to claim 7, wherein the optical fiber collimation module comprises n optical collimators, and the n optical collimators have one-to-one correspondence to the n optical fiber loops; and
a target optical collimator in the n optical collimators is configured to convert the light ray of a photon in a target optical fiber loop into a collimated light ray to propagate in the free space; and
the target optical fiber loop is an optical fiber loop corresponding to the target optical collimator in the n optical fiber loops.

10. The apparatus according to claim 1, wherein the delay generation module is isolated from environment temperature, so as to maintain a polarization state of each photon during a delay operation.

11. The apparatus according to claim 1, wherein the feedforward measurement module comprises: a first polarizing beam splitter, the active optical element, a wave plate, a second polarizing beam splitter, a detector, and a driver of the active optical element:
the first polarizing beam splitter is configured to obtain photons of a first polarization state;
the active optical element is configured to change a polarization state of the photons of the first polarization state to obtain photons of a second polarization state;
the wave plate and the second polarizing beam splitter are configured to separate a photon of at least one single polarization state from the photons of the second polarization state; and
the detector is configured to detect light intensity of the photon of at least one single polarization state.

12. The apparatus according to claim 1, wherein the active optical element comprises an electro-optical modulator.

13. A quantum computing system, comprising the optical apparatus for quantum computing according to claim 1.

14. A multi-photon mode active optical feedforward method, applied in an optical apparatus for quantum computing, the apparatus comprising: a delay generation module, an optical fiber collimation module, a quasi-spatial mode generation module and a feedforward measurement module, and the feedforward measurement module comprising an active optical element configured to modulate optical signals; and
the method comprising:
generating, by the delay generation module, different time delays for n photons respectively, so that the n photons arrive at the active optical element at different times respectively, n being an integer greater than 1;
converting, by the optical fiber collimation module, light rays of the n photons into n collimated light rays to propagate in a free space;
controlling, by the quasi-spatial mode generation module, the light rays of the n photons propagating in the free space to pass through the same active optical element in sequence, the active optical element being configured to modulate optical signals of the n photons in sequence according to a time sequence in which the n photons arrive at the active optical element; and
performing, by the feedforward measurement module, polarimetry on a modulated optical signal of a first photon to obtain a measurement result of the first photon, the measurement result of the first photon being used for performing feedforward compensation or feedforward error correction on a measurement result of a second photon to be measured; the first photon being one of the n photons, and the second photon being a next photon to be measured of the first photon.

15. A non-transitory computer-readable storage medium, storing at least one computer program, the computer program being loaded and executed by a processor to implement the method according to claim 14.

* * * * *